United States Patent
Falk (10) Patent No.: US 9,917,995 B2
(45) Date of Patent: Mar. 13, 2018

(54) METHOD, TRANSMISSION UNIT, SYSTEM AND COMPUTER PROGRAM FOR WIRELESS COMMUNICATION BETWEEN A CAMERA AND AT LEAST ONE REMOTE FLASH DEVICE

(71) Applicant: PROFOTO AB, Sudbyberg (SE)

(72) Inventor: Anton Falk, Huddinge (SE)

(73) Assignee: PROFOTO AB, Sundbyberg (SE)

( * ) Notice: Subject to any disclaimer, the term of this patent is extended or adjusted under 35 U.S.C. 154(b) by 0 days.

(21) Appl. No.: 14/916,965

(22) PCT Filed: Feb. 24, 2014

(86) PCT No.: PCT/SE2014/050224
§ 371 (c)(1),
(2) Date: Mar. 4, 2016

(87) PCT Pub. No.: WO2015/038047
PCT Pub. Date: Mar. 19, 2015

(65) Prior Publication Data
US 2016/0219201 A1    Jul. 28, 2016

(30) Foreign Application Priority Data
Sep. 16, 2013   (SE) ...................... 1351061

(51) Int. Cl.
*H04N 5/225* (2006.01)
*G03B 15/05* (2006.01)
(Continued)

(52) U.S. Cl.
CPC .......... *H04N 5/2256* (2013.01); *G03B 15/05* (2013.01); *H04N 5/04* (2013.01); *H04N 5/23203* (2013.01);
(Continued)

(58) Field of Classification Search
CPC .......... H04N 5/2256; H04N 5/44; H04N 5/04; H04N 5/23203; G03B 15/05; G03B 2206/00; G03B 2215/0557
See application file for complete search history.

(56) References Cited

U.S. PATENT DOCUMENTS 6,178,296 B1   1/2001   Kojima
6,404,987 B1   6/2002   Fukui
(Continued)

FOREIGN PATENT DOCUMENTS

GB   2154341   9/1985
GB   2477406   8/2011
(Continued)

OTHER PUBLICATIONS

Office Action dated Apr. 16, 2014 in corresponding application No. SE 1351061-5.
(Continued)

*Primary Examiner* — Padma Haliyur
(74) *Attorney, Agent, or Firm* — Knobbe, Martens, Olson & Bear, LLP (57) ABSTRACT

The present invention generally relates to the field of communication between electronic devices used for photography. In particular, the invention relates to a method, transmission unit, system and computer program for wireless communication between a camera and at least one remote flash device, such as photoflash units and related equipment. More in particular, the invention provides a way of controlling a plurality of flash devices from an intermediate radio transmission unit mountable on the camera, and utilized a delay a sequence flash control sequence so as to synchronize the function of the camera and the remote flash devices during image acquisition.

21 Claims, 3 Drawing Sheets

(51) Int. Cl.
 H04N 5/04 (2006.01)
 H04N 5/232 (2006.01)
 H04N 5/44 (2011.01)
(52) U.S. Cl.
 CPC ........... *H04N 5/44* (2013.01); *G03B 2206/00* (2013.01); *G03B 2215/0557* (2013.01)

(56) References Cited

U.S. PATENT DOCUMENTS

| | | | |
|---|---|---|---|
| 7,783,188 | B2 | 8/2010 | Clark |
| 8,854,536 | B2 | 10/2014 | Ogasawara |
| 2008/0298793 | A1 | 12/2008 | Clark |
| 2009/0135262 | A1* | 5/2009 | Ogasawara ............ G03B 15/02 348/211.4 |
| 2009/0196595 | A1 | 8/2009 | Okubo |
| 2010/0008658 | A1 | 1/2010 | King |
| 2010/0124412 | A1 | 5/2010 | King |
| 2010/0202767 | A1 | 8/2010 | Shirakawa |
| 2011/0123185 | A1 | 5/2011 | Clark |
| 2011/0188845 | A1 | 8/2011 | Hanayama et al. |
| 2012/0033959 | A1 | 2/2012 | King |
| 2012/0045193 | A1 | 2/2012 | King |
| 2013/0069559 | A1 | 3/2013 | Li et al. |
| 2013/0128101 | A1 | 5/2013 | Midorikawa |
| 2016/0198078 | A1 | 7/2016 | Falk |
| 2016/0248960 | A1 | 8/2016 | Falk |

FOREIGN PATENT DOCUMENTS

| | | |
|---|---|---|
| JP | 2004-029184 | 1/2004 |
| WO | WO 2015/038061 | 3/2015 |
| WO | WO 2015/047150 | 4/2015 |

OTHER PUBLICATIONS

Extended European Search Report in Patent Application No. 14844826.9, dated Apr. 13, 2017 in 8 pages.
Office Action dated Nov. 4, 2014 in corresponding application No. SE 1351124-1.
Extended European Search Report in Patent Application No. 14844738.6, dated May 2, 2017 in 10 pages.
International Preliminary Report on Patentability for International Application No. PCT/SE2014/051072, filed on Sep. 16, 2014 in 6 pages.
International Preliminary Report on Patentability for International Application No. PCT/SE2014/050224, filed on Feb. 24, 2014 in 12 pages.
International Preliminary Report on Patentability for International Application No. PCT/SE2014/050225, filed on Feb. 24, 2014 in 6 pages.
International Search Report for International Application No. PCT/SE2014/051072, filed on Sep. 16, 2014 in 5 pages.
International Written Opinion for International Application No. PCT/SE2014/051072, filed on Sep. 16, 2014 in 5 pages.
International Search Report for International Application No. PCT/SE2014/050224, filed on Feb. 24, 2014 in 5 pages.
International Written Opinion for International Application No. PCT/SE2014/050224, flied on Feb. 24, 2014 in 5 pages.
International Search Report for International Application No. PCT/SE2014/050225, filed on Feb. 24, 2014 in 5 pages.
International Written Opinion for International Application No. PCT/SE2014/050225, filed on Feb. 24, 2014 in 5 pages.

* cited by examiner

METHOD, TRANSMISSION UNIT, SYSTEM AND COMPUTER PROGRAM FOR WIRELESS COMMUNICATION BETWEEN A CAMERA AND AT LEAST ONE REMOTE FLASH DEVICE

CROSS-REFERENCE TO RELATED APPLICATIONS

This application is the U.S. National Phase under 35. U.S.C. § 371 of International Application PCT/SE2014/050224, filed Feb. 24, 2014, which claims priority to Swedish Patent Application No. 1351061-5, filed Sep. 16, 2013. The disclosures of the above-described applications are hereby incorporated by reference in their entirety.

TECHNICAL FIELD

The present invention generally relates to the field of communication between electronic devices used for photography. In particular, the invention relates to a method, transmission unit, system and computer program for wireless communication between a camera and at least one remote flash device, such as photoflash units and related equipment.

BACKGROUND ART

Photoflash units, also called flash devices, flash lighting devices etc, of various kinds are commonly used in photography for producing a flash of artificial light to help illuminate a scene, a scene which would otherwise be perceived as underexposed, i.e. too dark, to the viewer of a captured picture of the scene. Other uses of flashes are capturing quickly moving objects or changing the quality of light. Most current flash lighting devices are electronic and have been developed through xenon-based flash devices to state of the art light emitting diode (LED) flash devices. Historically, flashes were produced by means of rather inconvenient arrangements, such as single-use flashbulbs and flammable powders. As a contrast to these historical arrangements, modern cameras often activate connected flash lighting devices automatically, and the rapid technological development of compact pocket cameras, mobile terminals and smart phones has nowadays led to relatively advanced, in-built cameras with very high resolution and adaptable flash devices as a de facto standard with few exceptions.

In order to utilize various commonly used flash lighting devices, camera bodies are according to internationally accepted standards equipped with a so-called hot shoe accessory connector. A flash lighting device may be connected, directly or through an extension cord, to the hot shoe connector. The emission of flash light from the lighting device can be synchronized to an image acquisition by the camera by a synchronization signal received by the lighting device. In prior art camera systems, this synchronization signal is transmitted from the camera to the flash device via its connection to the hot shoe connector.

In modern applications of camera systems and in studio equipment for photography, a remote flash lighting device can be triggered by wireless synchronization, which has been realized using optical, such as infrared, and radio frequency communications to the remote flash device. Radio frequency synchronization typically involves connecting a radio transmitter to the camera body and a radio receiver to the remote flash device. The radio transmitter sends a signal to the radio receiver to activate the remote flash device in synchronization with image acquisition by the camera. For that purpose, radio frequency communication systems may include a transmitter at the remote flash device for sending a confirmation signal back to the camera side radio, indicating that the flash-side radio has successfully activated the flash lighting device in use.

In order for such two-way communication in a camera system to be fully functional and reliable, it is necessary for the camera and for the flash device to comply with standards available. Also their respective external or integrated modules for the execution of communication there between, need to be compatible and to support existing standards with respect to signalling schemes that are in use by different camera and flash device manufacturers on the market. Since standardization available in the field is allowing for deviations with respect to certain more advanced functions, both mechanically and electronically, it is in practice hard or even impossible to satisfy all requirements if complete operability is requested.

Through-the-lens (TTL) flash photographic control typically involves the camera body measuring lighting conditions, such as an amount of energy in the form of light, provided by a flash lighting device during a test firing or preflash of the flash device. The measurement is performed through the lens of the camera. The camera then provides an indication to the flash device connected to the hot shoe connector of the amount of light, i.e. provision of power and timing, to be applied by a main flash during the actual image acquisition procedure. The indication of the amount of light can be made by providing start and stop signals to the flash device via the hot shoe connector.

In another example of TTL flash photographic control, the indication of the amount of light can be made by providing a serial data, via the hot shoe connector to the flash device connected thereto, that includes an adjustment to the amount of light that was provided in the preflash. The flash device in the hot shoe connector can activate a remote flash light by utilizing optical flash pulses, such as visible light or infrared light. The optical pulses can also be used to send TTL power adjustments to the remote flash device. However, according to this control system, the remote lighting devices are not providing any information back to the flash lighting device in the hot shoe connector of the camera body. This system therefore requires that a light emitting device be connected to the hot shoe connector.

Using camera and flash or similar lighting systems presently available on the market means that the choice of camera in practice limits the choice of flash device or related lighting device, or alternatively, in the sense that a flash or lighting device limits the choice of camera. Each manufacturer of cameras advocates its own specific communication protocol for communication with flash devices intended for use with that particular camera. For an amateur photographer who is in possession of a flash device, which cannot be used any longer together with certain camera equipment because of the above mentioned limitation, this may be greatly discouraging. For a professional photographer, or a commercial studio environment collaborating with many different photographers with varying preferences in their choice of camera equipment, this may be a severe limitation. To overcome the limitation, professional studios are typically obliged to be equipped with numerous brands of flash devices, so as to accommodate the needs of any professional photographer, and as a consequence the costs to the studio are substantially increased.

There have been made attempts to overcome the mentioned problem. Flash lighting devices have been available that allow for mechanical substitution of the part in contact with the hot shoe connector of the camera. However, having to modify the lighting devices to be used to various camera bodies is highly undesired. In addition to that, there is no way of overcoming the limitation that use of numerous lighting devices together with one camera is impossible, unless all lighting devices are produced by the same vendor and thus are recommended and fully compatible with the camera equipment in use. When consideration is made to a standard type of studio environment, lighting devices of different types and brands are often hinged near the ceiling of the studio and therefore in practice impossible to adjust or substitute components on, only to be usable together with various cameras.

It is therefore conceivable to assume that a market incentive exists to remove the mentioned limitations one way or the other. However, despite this incentive, and despite prior attempts to overcome problems relating to the limited choice of equipment due to lacking interoperability, there is presently no solution available. It would seem logical to develop and introduce to the market flash devices that are able to simultaneously operate with a variety of different camera types and brands. No such flash devices have yet been developed.

SUMMARY OF THE INVENTION

It is therefore an object of the present invention to alleviate the above limitations. This object is attained by a method, a transmission unit, a system and a computer program for controlling settings of at least one remote flash device and for synchronizing its function to image acquisition of a camera, using an intermediate radio transmission unit for wireless transmission of radio signals to the remote flash device and for bi-directionally exchanging signals with the camera via a physical connection between the intermediate radio transmission unit and the camera, the method comprising the steps of:

the camera transmitting to the intermediate radio transmission unit a preflash activation signal, the intermediate radio transmission unit starting a timer causing a delay, which delay together with a subsequent time period for forwarding the preflash activation signal to the remote flash device and another subsequent time period for the remote flash device to receive and transform the preflash activation signal into emission of light energy, the delay together with subsequent time periods being adapted to coincide in time with a predetermined delay between the point in time when the camera transmits the preflash activation signal and the point in time when the camera initiates a preflash image analysis, in dependence on the preflash image analysis, determining settings to be applied during a subsequent main flash, transmitting, from the camera via the intermediate radio transmission unit to the remote flash device, settings for the remote flash device to apply during the main flash, and transmitting, from the camera via the intermediate radio transmission unit to the remote flash device, a main flash activation signal upon which the main flash and image acquisition occurs.

One of the main advantages of the present invention is the solution to the previously mentioned shortcomings. The invention eliminates the problem of proprietary communication protocols limiting photographers and professional studios to the use of only flash devices of the same brand as their camera equipment, due to lacking interoperability between camera systems from different producers. By means of the present invention, the signalling from the intermediate radio transmission unit is standardized to the greatest extent possible, in order to enable communication with a wide range of available remote flash devices, high end models and more average ones, modern and relatively old ones.

Another significant advantage of the present invention is that all signals exchanged between the camera and the remote flash devices, i.e. transmission of information and commands related to the functionality of the remote flash devices, are transmitted from the camera via the intermediate radio transmission unit to remote flash devices in its control. No signalling goes from the remote flash devices in use back to intermediate radio transmission unit or to the camera, which simplifies the process and makes it possible for the camera to control not only one, but a plurality of remote flash devices and related equipment. The invention is operable without overly complicating the signalling or requiring confirmation messages to be sent from the remote flash devices via the intermediate radio transmission unit and back to the camera.

The present invention provides a way of utilizing available industrial standards relating to communication interfaces for signalling between devices of a camera system. Thus, by limiting signalling and commands from the intermediate radio transmission unit to generic portions of proprietary communication interface protocols of different camera and flash device producers, compatibility between devices is achieved. This is aspect of the present invention, gives the photographer a wider range of options by making photographic devices interoperable between different brands.

In accordance with another aspect of the present invention, the intermediate radio transmission unit is attached to the hot shoe connector of the camera. The transmission from the intermediate radio transmission unit is wireless, typically within the ordinary radio frequency range, and thus the need to place a flash device in hot shoe connector on the camera is replaced by the intermediate radio transmission unit, which provides a more versatile and flexible solution. This is a way of obtaining a functional TTL control system without having to attach the flash device to the hot shoe connector of the camera is highly beneficial to studio photographers in particular.

In accordance with yet another aspect of the present invention, an aspect which is realized in a further embodiment of the invention, adaptation is made of operational properties of the intermediate radio transmission unit to corresponding operational properties of the camera to which it is connected. The operational properties of the intermediate radio transmission unit may then relate to the signalling scheme used for communication with the connected camera. As previously mentioned, all cameras are not able to communicate with all flash devices. Therefore, by adapting the intermediate radio transmission unit, possibly by altering its signalling scheme to the commanding camera, while simultaneously maintaining the standardized interface towards the remote flash devices in use, interactivity between various comprised units in a camera system having digital TTL functionality commanding a remote flash device system is obtained.

In accordance with another embodiment of the present invention, the remote flash device uses an in-built flash radio receiver unit for communicating with the intermediate radio transmission unit. Also use of an external receiver means for receiving information and commands from the intermediate radio transmission unit is a possible realization of the invention. By using modules for the communication between devices, compatibility between different brands, models and production years is ensured, and so is a way for new producers of communication devices for use in the field of photography to enter into the market and compete with the already established producers.

In yet another embodiment of the invention, an indication that the remote flash device is either unavailable or available, is realized by setting a clock signal in its low or high state, respectively. This is realized in a manner to utilize to the maximum already existing functionality in the intermediate radio transmission unit, so as to avoid unnecessary complexity and additional costs to the end customers. This clock signal may also be replaced by an acknowledge signal from the intermediate transmission unit, possibly delayed for a certain time period so as to effect the timing of the camera. This because the camera may need to await the acknowledgement signal as a confirmation, before it initiates action of some kind.

According to one of the more important aspects of the present invention, the wireless transmission realized by the intermediate radio transmission unit enables all necessary communication without the need to attach flash devices physically to the hot shoe connector of the camera. The remote flash device may thus comprise a plurality of units forming an arrangement that is capable of managing a wide variety of different lighting conditions during image acquisition.

The present invention therefore enables complete functionality of the camera and a remote flash device system of any kind, so as to obtain an optimal quality of captured images during a photographic session.

BRIEF DESCRIPTION OF THE DRAWINGS

Objects, advantages and effects as well as features of the invention will be more readily understood from the following detailed description of exemplary embodiments of the invention when read together with the accompanying drawings, in which.

DETAILED DESCRIPTION

Throughout this document, the term flash refers either to the flash of light itself or to the electronic flash unit discharging the light.

Through-the-lens (TTL) flash photographic control originally appeared in about 1980 in analogue form and has later been transformed into digital TTL, which is even more accurate also allows for more advanced functionality. The main features of digital TTL are that prior to the actual exposure and the firing of the main flash, one or more small flashes called preflashes are emitted. The light returning through the lens is measured and this value is used to calculate the amount of light necessary for the actual exposure. Multiple preflashes can be used to improve the flash output. Canon refers to this technique as "E-TTL" and has recently improved the system with a new generation "E-TTL II". The first form of digital TTL by Nikon, called "D-TTL", was originally introduced, and since then, the superior "i-TTL" system has been promoted. From a user's perspective, the two digital TTL versions E-TTL and i-TTL are unfortunately incompatible, at least with respect to more advanced functionality, of which all modern digital flash control systems are full.

When using front-curtain flash, i.e. when the flash fires immediately after the shutter opens, the preflashes and main flash appear as one to the human eye, since there is very little time between them. When using rear-curtain flash, i.e. when the flash fires at the end of the exposure, and a slow shutter speed, the distinction between the main flash and the preflashes is more obvious.

Different cameras and flash units are naturally associated with different specifications and performance, depending on model, intended market segment and production year. Some cameras and flash units take more information into account when calculating the necessary flash output, including the distance of the subject to the lens. This improves the lighting when a subject is placed in front of a background, in particular when the background is substantially darker than the subject to the lens. If the lens is focused on the subject, the flash will be controlled to allow for proper exposure on the subject, thus leaving the darker background underexposed. Alternatively, if the lens is focused on the background, the background will be properly exposed, leaving the subject in the foreground typically overexposed. This technique requires both a camera capable of calculating the distance information, as well as the lens being capable of communicating the focal distance to the body.

More advanced TTL flash techniques include off-camera flash lighting, where one or more flash units are located at different locations around the subject. In this case a so-called commander unit, which can be integrated in the camera body, is used to control all of the remote units. The commander unit usually controls the remote flashes by using flashes of visible or infrared light. The photographer can normally vary the light ratios between the different flashes. However, as mentioned, the lacking interoperability between brands and models is still a limitation that has not yet been completely circumvented, at least not in a way that is satisfying to stakeholders like photographers and studios.

Figure 1:
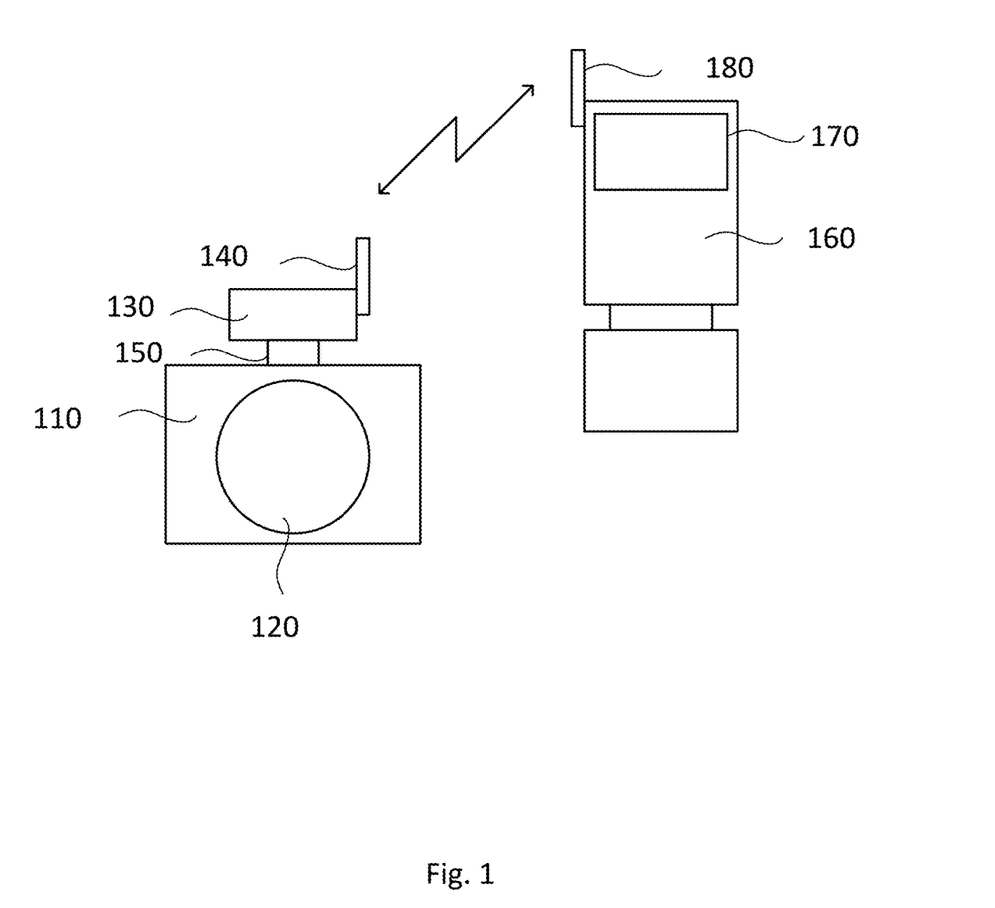
FIG. 1 schematically illustrates a camera system according to the present invention, the system comprising a camera, an intermediate radio transmission unit and a plurality of flash devices controlled by the camera.

With particular reference to FIG. 1, a schematic picture illustrates a camera system according to the present invention. The system includes a camera 110 with a lens 120 and objective. The camera is equipped with a hot shoe connector 150, on which an intermediate radio transmission unit 130 is attached. An antenna 140 of the intermediate transmission unit is shown, from which signals are transmitted to be received by a corresponding receiver antenna 180 on a remote flash device 160 having a transparent window 170 from which the actual flash light is to be illuminated.

When a camera is used in conjunction with a photoflash unit, the photoflash unit can fail to fire, depending upon a variety of causes. Possible causes include a failure of the camera itself or the photoflash unit, poor electrical contact at the connection between the two, and the signals transferred to the photoflash unit for firing being improper.

The international standard ISA 10330:2002(E) specifies electrical requirements of a camera synchronizer, an ignition circuit in a photoflash unit and a cable to connect these comprised units in a general photoflash system. Of course, the cable may be exchanged with a wireless transmission system without departing from the scope of the standard, which is also directed towards test specification of methods to secure positive firing of the photoflash unit.

Figure 2:
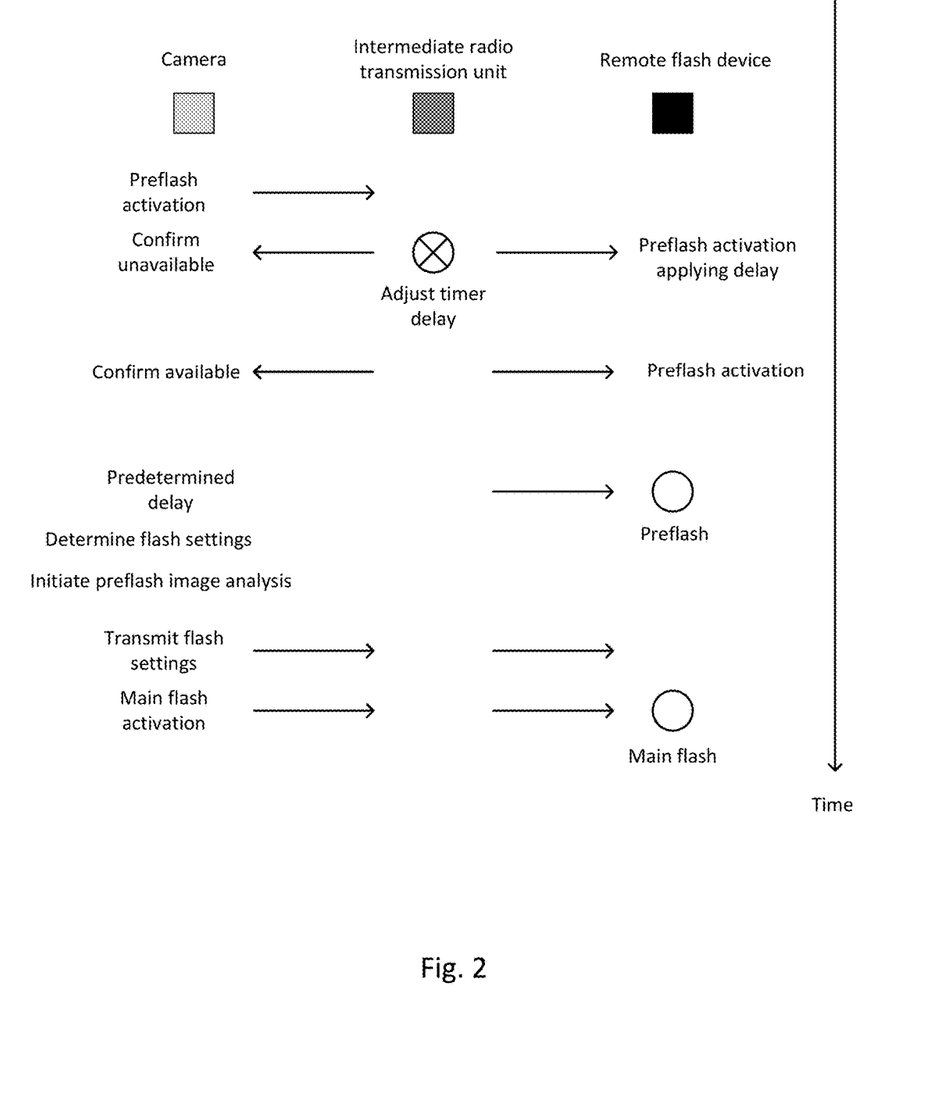
FIG. 2 illustrates a signalling scheme of digital TTL flash photographic control according to the present invention.
Figure 3:
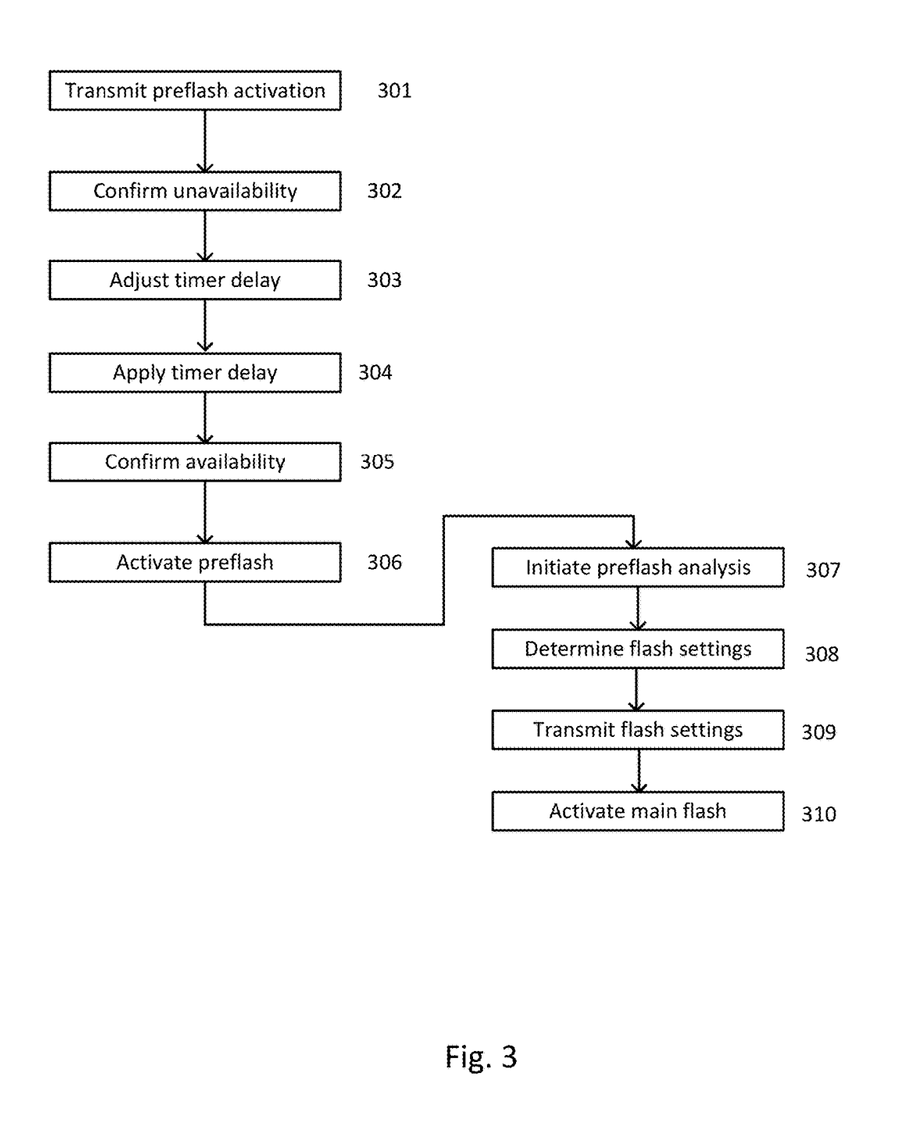
FIG. 3 illustrates a flow chart of the method for wireless communication according to the present invention.

Referring to FIGS. 2 and 3, a signalling scheme and a flow chart according to the present invention are displayed. Signals are exchanged between the three main constituents comprised, the camera, the intermediate radio transmission unit and one remote flash device, in wireless control and to which a plurality of remote flash devices can be added. The sequence begins in that the camera transmits to the intermediate radio transmission unit a preflash activation signal 301. Thereafter, the intermediate radio transmission unit starts a timer 303 causing a delay, which delay together with a subsequent time period for forwarding the preflash activation signal to the remote flash device and another subsequent time period for the remote flash device to receive and transform the preflash activation signal into emission of light energy, constitutes a compound delay of the mentioned three different time periods. This compound delay is variable in that the timer delay is adjustable. Adaptation is thus made so as to let the compound delay coincide in time with a predetermined delay between the point in time when the camera transmits the preflash activation signal and the point in time when the camera initiates a preflash image analysis 307.

This adaptation therefore enables the preflash image analysis 307 to occur in synchronization with the preflash. This has the effect that the camera acts as if it has a flash device attached to its hot shoe connector, but instead of the flash device, a transmitter is attached to the camera and this transmitter controls a number of remote flash devices in synchronization with the digital TTL functionality of the camera.

In dependence on the preflash image analysis, the camera determines settings 308 to be applied during a subsequent main flash, and transmits, via the intermediate radio transmission unit to the remote flash device, the determined settings 309 for the remote flash device to apply during the main flash, and transmits, also via the intermediate radio transmission unit to the remote flash device, a main flash activation signal 310 upon which the main flash and image acquisition occurs.

Information about the predetermined delay can be retrieved from the camera, from a memory associated to the camera or to the intermediate radio transmission unit, It can also be determined through a test sequence, whereby the intermediate radio transceiver unit runs a test cycle so as to obtain the time in which light is captured during the preflash image analysis.

One of the definitions used in flash photography is the synchronizer or synchronizing means. By this is meant a device provided in a camera or shutter unit, which fires the photoflash unit in synchronization with the operation of the camera shutter, and which comprises synchronizer terminals, a synchronization switch and an electronic circuit that connects the two.

Polarities of the synchronizer terminals in a camera and that of the ignition circuit terminals in a photoflash unit coupled with the camera are predefined. The polarity of the synchronizer terminals shall be matched to that of the ignition circuit terminals in the coupled photoflash unit. The construction of the present invention is aligned with such requirements so as to be applicable with known international standard interfaces.

For the camera accessory shoe with electrical contacts, which is commonly designated the hot shoe connector of the camera, and for the foot of photoflash equipment with electrical contacts, which is commonly designated foot of the flash device, positive, negative and/or grounded poles and their relative potentials are predefined. Also the geometry of the hot shoe and the foot are predetermined, which is a requirement for interoperability of different cameras and flash devices. However, additional poles and connection points may have been arranged by different camera or flash producers so as to allow for added functionality, which goes beyond the standardized functions and requirements. As a result of this practice of adding connection points that are adapted to governing the additional functions, and despite the international standardization efforts, interoperability of different brands of camera models and flash equipment is lost. Some functions of more simple nature may still work, but the broad range of additional functions, necessary at least for a professional photographer are no longer possible to utilize, unless the camera and related flash device and other equipment are perfectly matched.

The detailed description is of the best mode presently contemplated for practicing the present invention. It is not intended to be taken in a limiting sense, but is made merely for the purpose of describing general principles. The scope of the invention is to be ascertained with reference to the issued claims.

What is claimed is:

1. A method for controlling settings of at least one remote flash device and for synchronizing its function to image acquisition of a camera, using an intermediate radio transmission unit for wireless transmission of radio signals to the remote flash device and for bi-directionally exchanging signals with the camera via a physical connection between the intermediate radio transmission unit and the camera, the method comprising the steps of:

the camera transmitting to the intermediate radio transmission unit a preflash activation signal, wherein a predetermined delay associated with the camera is retrieved before or at the point in time when the preflash activation signal is transmitted, wherein an indication that the remote flash device is either unavailable or available is realized by an acknowledgement signal from the intermediate radio transmission unit, the acknowledgement signal delayed for a certain time period so as to effect the timing of the camera, the intermediate radio transmission unit starting a timer causing a delay, which delay together with a subsequent time period for forwarding the preflash activation signal to the remote flash device and another subsequent time period for the remote flash device to receive and transform the preflash activation signal into emission of light energy, the delay together with subsequent time periods being adapted to coincide in time with the predetermined delay between the point in time when the camera transmits the preflash activation signal and the point in time when the camera initiates a preflash image analysis, in dependence on the preflash image analysis, determining settings to be applied during a subsequent main flash, transmitting, from the camera via the intermediate radio transmission unit to the remote flash device, settings for the remote flash device to apply during a main flash, and transmitting, from the camera via the intermediate radio transmission unit to the remote flash device, a main flash activation signal upon which the main flash and image acquisition occurs.

2. The method according to claim 1, wherein the timer delay applied by the intermediate radio transmission unit is adapted based on a sequence in which the intermediate radio transmission unit determines the predetermined delay of the camera based on the amount of light energy captured by successive measurements during the preflash image analysis.

3. The method according to claim 1, wherein the timer delay applied by the intermediate radio transmission unit is adapted based on data retrieved from the camera relating to the predetermined delay applied by that particular camera.

4. The method according to claim 1, wherein the timer delay applied by the intermediate radio transmission unit is adapted based on data retrieved from an associated data carrying memory indicative of predetermined delays of different cameras.

5. The method according to claim 1, wherein the intermediate radio transmission unit is mountable in a hot shoe connector of the camera.

6. The method according to claim 1, wherein the preflash image analysis is made to determine settings relating to the amount of light energy required for the exposure of an image acquisition in present lighting conditions.

7. The method according to claim 1, wherein the predetermined delay is between 650 and 750 µs.

8. The method according to claim 1, wherein the timer delay is integrated in anyone of the other subsequent time periods for forwarding the preflash activation signal and for receiving and transforming the preflash activation signal following the timer delay.

9. The method according to claim 1, wherein the timer delay is 100 µs, the subsequent time period for forwarding the preflash activation signal to the remote flash device fall is 490 µs, and the another subsequent time period for the remote flash device to receive and transform the preflash activation signal into emission of light energy is 100 µs.

10. A method for controlling settings of at least one remote flash device and for synchronizing its function to image acquisition of a camera, using an intermediate radio transmission unit for wireless transmission of radio signals to the remote flash device and for bi-directionally exchanging signals with the camera via a physical connection between the intermediate radio transmission unit and the camera, the method comprising the steps of:
the camera transmitting to the intermediate radio transmission unit a preflash activation signal,
the intermediate radio transmission unit starting a timer causing a delay, which delay together with a subsequent time period for forwarding the preflash activation signal to the remote flash device and another subsequent time period for the remote flash device to receive and transform the preflash activation signal into emission of light energy, the delay together with subsequent time periods being adapted to coincide in time with a predetermined delay between the point in time when the camera transmits the preflash activation signal and the point in time when the camera initiates a preflash image analysis,
in dependence on the preflash image analysis, determining settings to be applied during a subsequent main flash,
transmitting, from the camera via the intermediate radio transmission unit to the remote flash device, settings for the remote flash device to apply during the main flash, and
transmitting, from the camera via the intermediate radio transmission unit to the remote flash device, a main flash activation signal upon which the main flash and image acquisition occurs,
wherein a confirmation signal is transmitted to the camera indicating that the remote flash device is momentarily unavailable, the indication being is realized by setting a clock signal of the intermediate radio transmission unit in its low state.

11. A method for controlling settings of at least one remote flash device and for synchronizing its function to image acquisition of a camera, using an intermediate radio transmission unit for wireless transmission of radio signals to the remote flash device and for bi-directionally exchanging signals with the camera via a physical connection between the intermediate radio transmission unit and the camera, the method comprising the steps of:
the camera transmitting to the intermediate radio transmission unit a preflash activation signal,
the intermediate radio transmission unit starting a timer causing a delay, which delay together with a subsequent time period for forwarding the preflash activation signal to the remote flash device and another subsequent time period for the remote flash device to receive and transform the preflash activation signal into emission of light energy, the delay together with subsequent time periods being adapted to coincide in time with a predetermined delay between the point in time when the camera transmits the preflash activation signal and the point in time when the camera initiates a preflash image analysis,
in dependence on the preflash image analysis, determining settings to be applied during a subsequent main flash,
transmitting, from the camera via the intermediate radio transmission unit to the remote flash device, settings for the remote flash device to apply during the main flash, and
transmitting, from the camera via the intermediate radio transmission unit to the remote flash device, a main flash activation signal upon which the main flash and image acquisition occurs,
wherein an availability signal is transmitted to the camera indicating that the remote flash device is available, the indication being realized by setting a clock signal of the intermediate radio transmission unit in its high state.

12. The method according to claim 1, wherein the intermediate radio transmission unit is adaptable to operational properties of the camera to which it is connected.

13. The method according to claim 12, wherein operational properties of the intermediate radio transmission unit relate to physical properties and/or the communication interface of the camera to which the unit is connected.

14. The method according to claim 1, wherein the remote flash device uses an in-built flash radio receiver unit for receiving signals from the intermediate radio transmission unit.

15. Intermediate radio transmission unit for wireless transmission of radio signals to at least one remote flash device and for bi-directionally exchanging signals with a camera via a physical connection between the intermediate radio transmission unit and the camera, the intermediate radio transmission unit being adapted to control settings of the remote flash device and to synchronize its function to image acquisition of the camera in accordance with the method of claim 1.

16. Camera system for controlling settings of at least one remote flash device and for synchronizing its function to image acquisition of a camera, the camera system including the intermediate radio transmission unit in accordance with claim 15, and being adapted to control settings of the remote flash device and to synchronize its function to image acquisition of the camera in accordance with the method.

17. A non-transitory computer readable medium having a program stored thereon for executing a computer to perform the method in accordance with claim 1.

18. The method according to claim 1, wherein the timer delay is determined before or at the point in time when the preflash activation signal is transmitted.

19. The method according to claim 1, wherein the timer delay of the intermediate radio transmission unit is synchronized with the predetermined delay of the camera before or at the point in time when the preflash activation signal is transmitted.

20. The method according to claim 1, wherein the predetermined delay is retrieved from the camera, a memory of the camera, or the intermediate radio transmission unit.

21. The method according to claim 7, wherein the predetermined delay is 690 µs.

* * * * *

UNITED STATES PATENT AND TRADEMARK OFFICE
CERTIFICATE OF CORRECTION

PATENT NO. : 9,917,995 B2
APPLICATION NO. : 14/916965
DATED : March 13, 2018
INVENTOR(S) : Anton Falk Page 1 of 1

It is certified that error appears in the above-identified patent and that said Letters Patent is hereby corrected as shown below:

On the Title Page

Item (71), (Applicant), Change "Sudbyberg (SE)" to --Sundbyberg (SE)--.

In Column 2 (page 2, item (56)) at Line 24, Under Other Publications, Change "flied" to --filed--.

In the Specification

In Column 7 at Line 42, Change "It" to --it--.

In the Claims

In Column 9 at Line 29, In Claim 9, after "device" delete "fall".

Signed and Sealed this
Fourth Day of September, 2018

Andrei Iancu
*Director of the United States Patent and Trademark Office*